United States Patent [19]

Mitchard et al.

[11] 3,964,953
[45] June 22, 1976

[54] APPARATUS AND METHOD FOR LAMINATING LINER TO BOX BLANK

[75] Inventors: John M. Mitchard, Cherry Hill, N.J.; Peter J. Loftus, Levittown, Pa.

[73] Assignee: Union Camp Corporation, Wayne, N.J.

[22] Filed: Mar. 25, 1975

[21] Appl. No.: 561,984

[52] U.S. Cl.................... 156/300; 93/1 A; 93/36.01; 156/351; 156/364; 156/570; 214/6 FS; 214/6 M; 214/8.5 D; 221/211; 270/58; 271/9; 271/91; 294/64 R

[51] Int. Cl.².............. B31B 1/62; B31B 1/06; B32B 31/12; B65H 39/04

[58] Field of Search........... 156/559, 571, 570, 297, 156/299, 300, 60, 364, 351; 270/58; 271/9, 90, 91; 221/210–213, 112; 93/1 A, 36 M, 36.01, 36.6; 229/14 R, 14 BL; 212/125, 135; 214/6 M, 6 FS, 8.5 R, 8.5 D; 294/64 R, 65

[56] References Cited
UNITED STATES PATENTS

| | | |
|---|---|---|
| 2,012,131 | 8/1935 | Kondolf .................... 229/14 R |
| 3,183,032 | 5/1965 | Warfel ....................... 294/65 |
| 3,334,891 | 8/1967 | Clausen et al. ............. 271/9 X |
| 3,367,823 | 2/1968 | Clausen et al. ............. 156/559 X |
| 3,423,119 | 1/1969 | Stanley ....................... 294/65 |
| 3,437,545 | 4/1969 | Bacon .......................... 156/559 X |
| 3,542,282 | 11/1970 | Troth ........................... 229/14 BL |
| 3,547,013 | 12/1970 | Gentry et al. ............... 156/570 X |

*Primary Examiner*—Douglas J. Drummond
*Assistant Examiner*—Thomas Bokan
*Attorney, Agent, or Firm*—Charles P. Bauer

[57] ABSTRACT

Apparatus and method for laminating a liner to a box blank in which a shuttle arrangement is provided to alternately pick up and place liners and blanks in proper registration for lamination. Such apparatus and method includes a shuttle arrangement with a unique vacuum cup suspension system for picking up such liners and blanks and a glue spray station which applies the glue to the liner.

4 Claims, 8 Drawing Figures

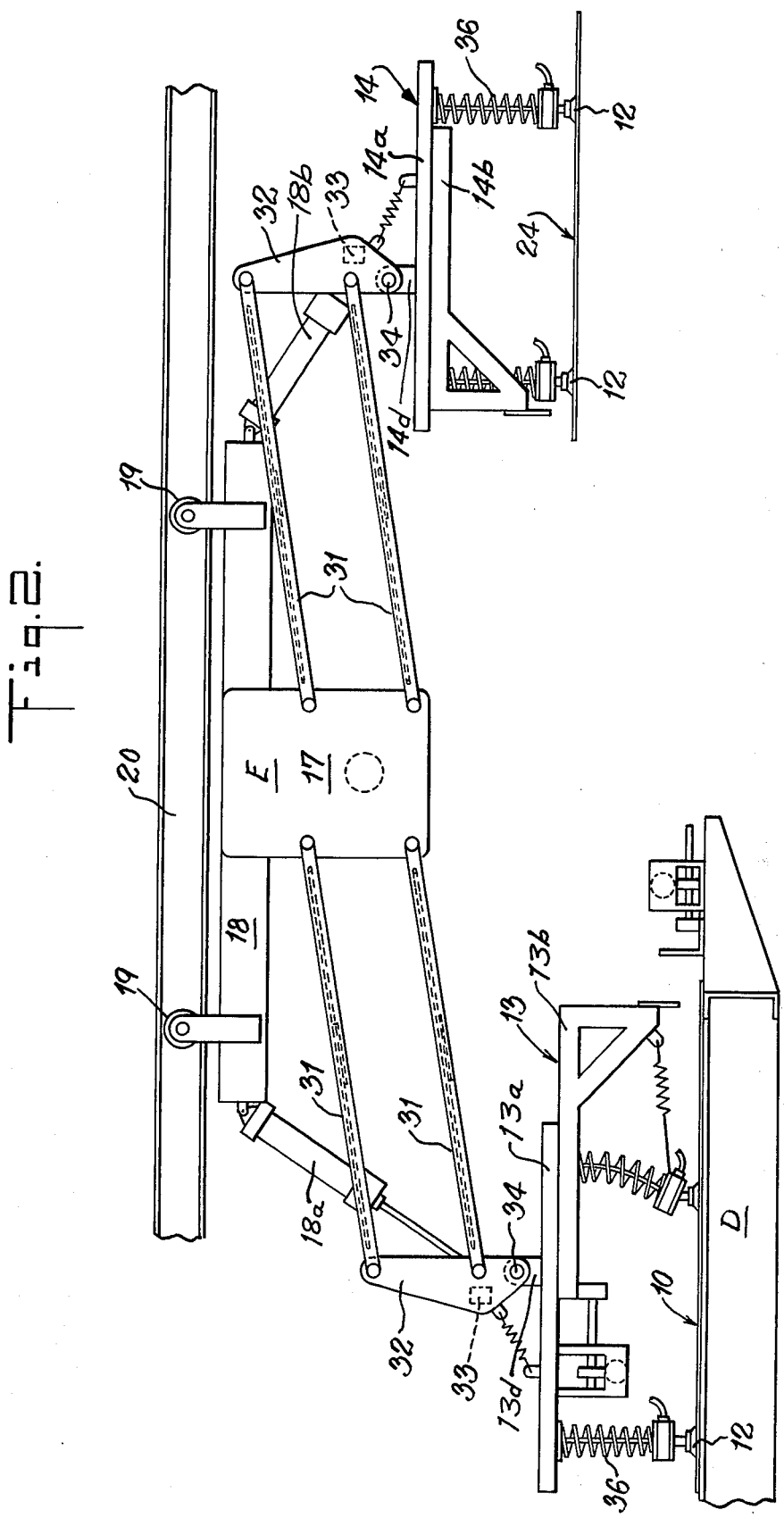

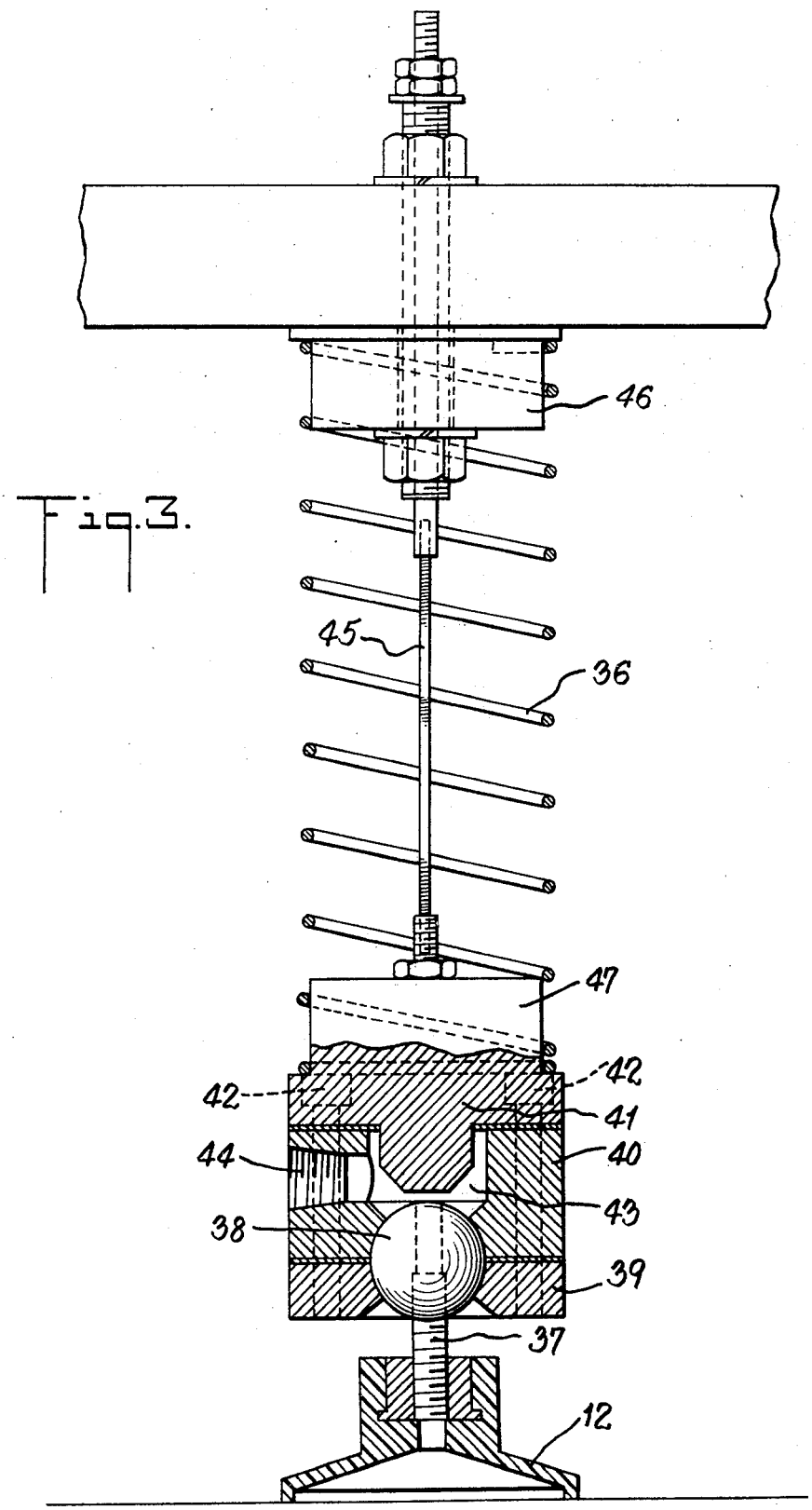

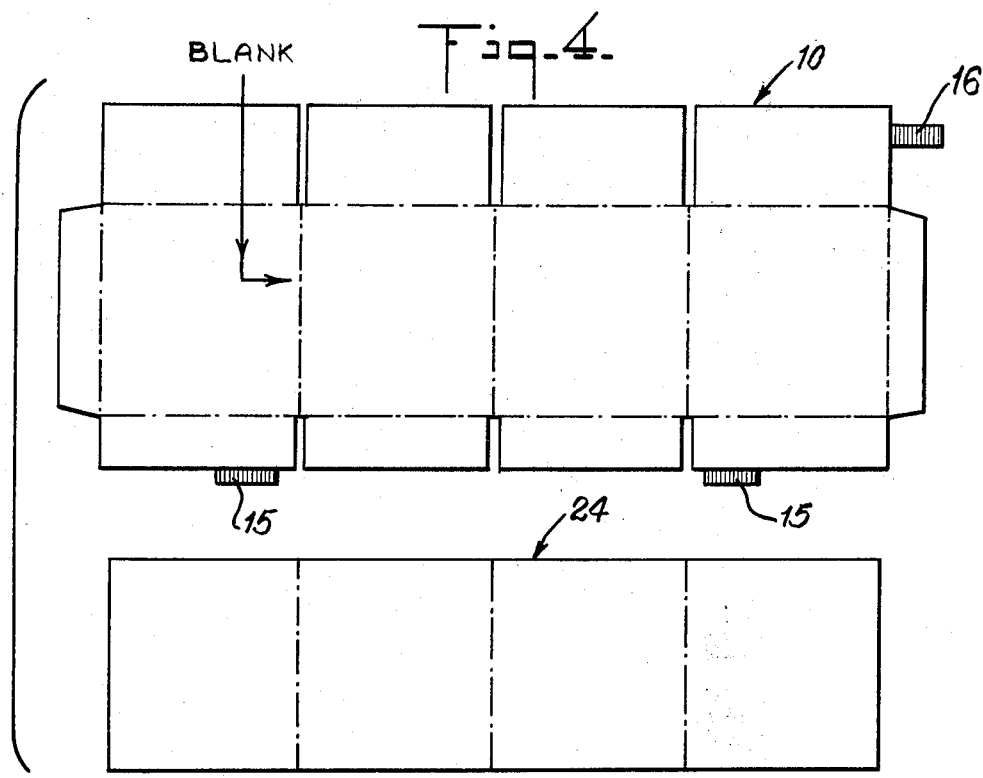
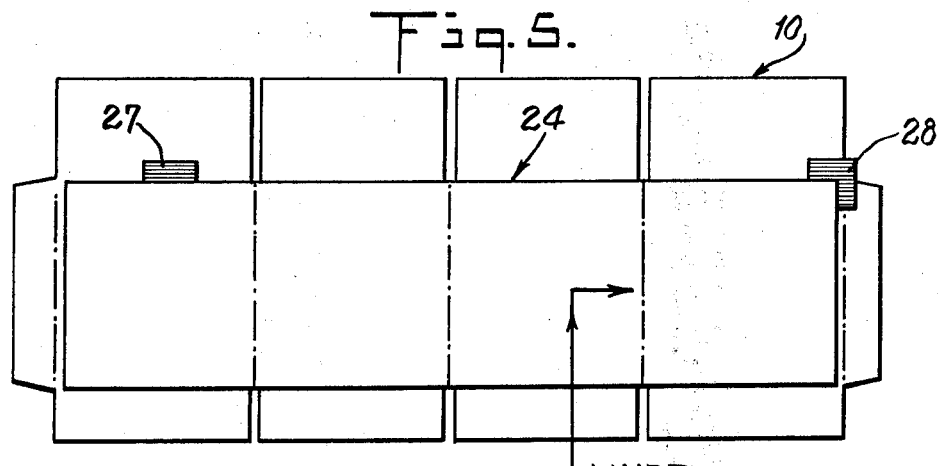
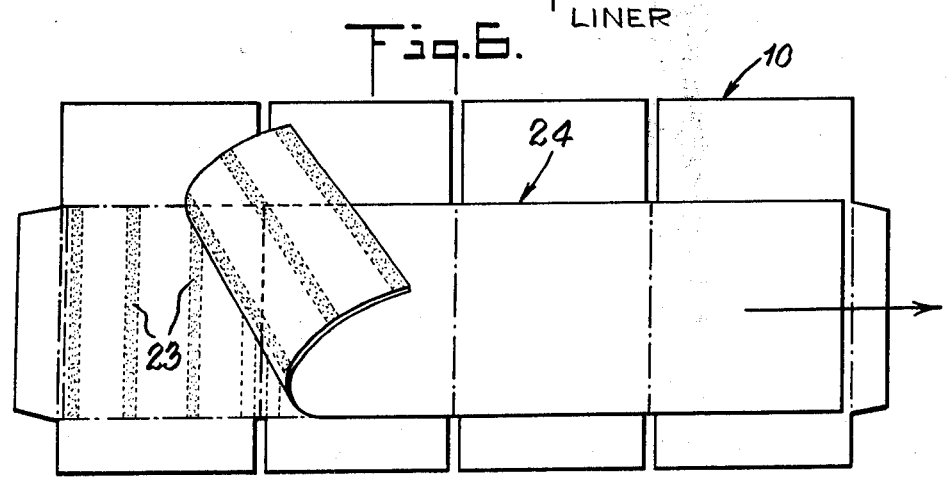

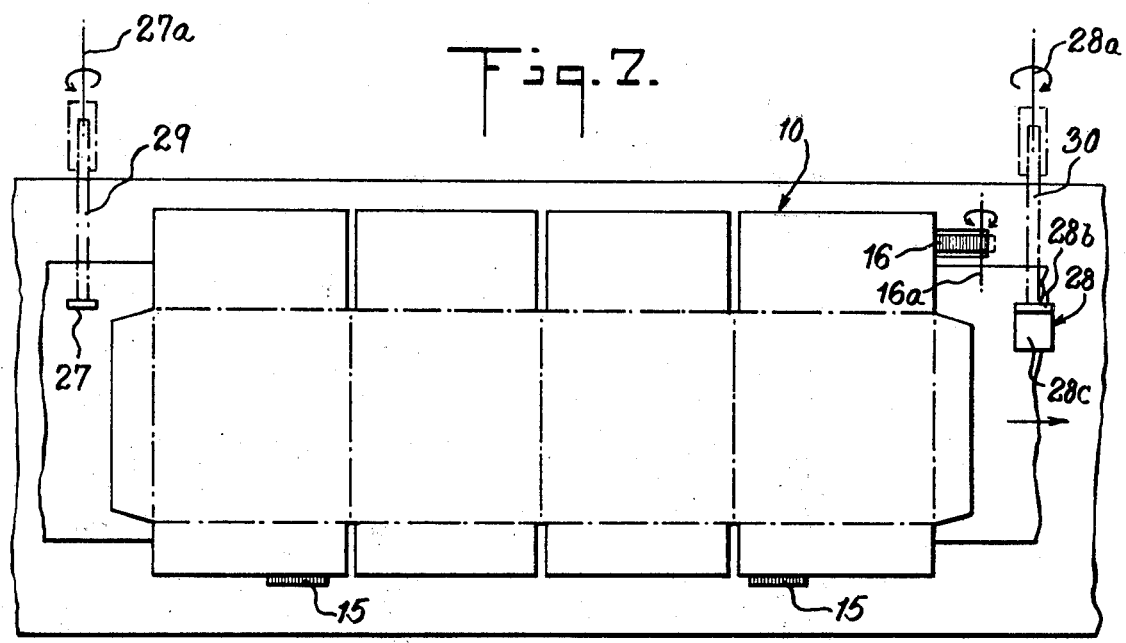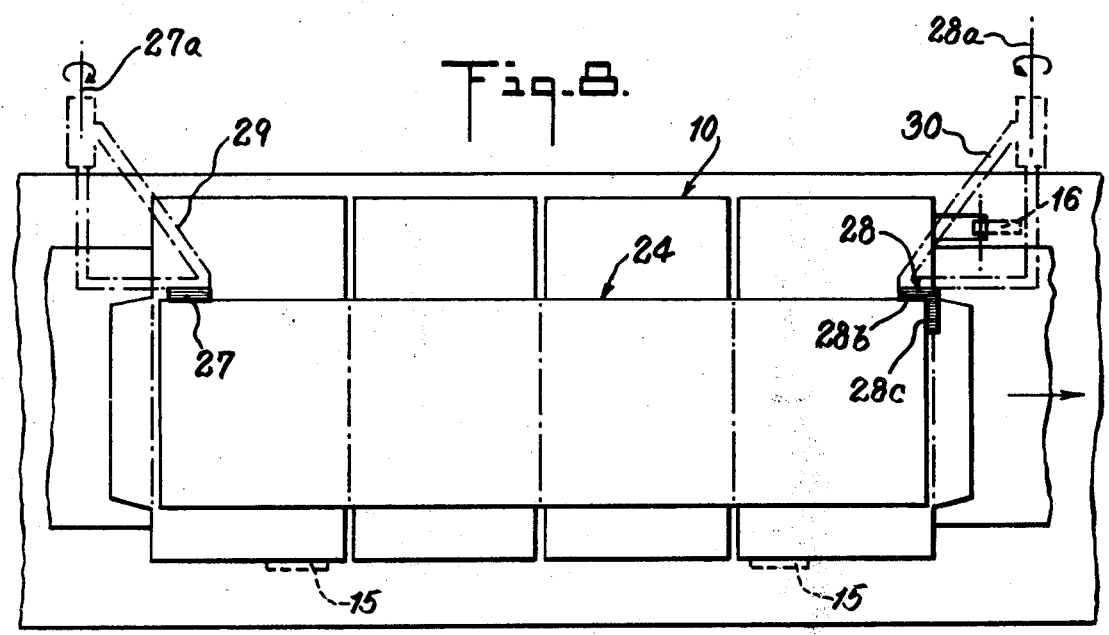

APPARATUS AND METHOD FOR LAMINATING LINER TO BOX BLANK

BACKGROUND OF THE INVENTION

This invention relates to an improvement in equipment for laminating a liner to the inside panels of a blank, designed in particular for a box which requires extra strength and rigidity in the side walls, such as a bulk box. Many of such blanks are extremely large and require more than one man to handle them. In most cases the liner laminating operation is manual, slow and expensive.

The equipment of the present invention seeks to reduce the labor for such operation, increase the production capacity and reduce production costs.

SUMMARY OF THE INVENTION

It is an object of the invention to provide equipment for laminating a liner to the panels of a box blank, particularly where large blanks for bulk boxes are to be laminated.

It is a further object to provide equipment for such lamination which embodies a shuttle arrangement to alternately pick up and place liners and blanks in proper registration for lamination.

It is a further object to provide equipment for such lamination in which the shuttle arrangement includes a vacuum cup suspension system which permits the liners and blanks to be independently raised and lowered.

It is a further object to provide equipment for such lamination which includes a glue spray station to apply glue to the liners as they move from a stack to the laminating station, such spraying being controlled and limited to confine the glue to the liner and prevent drifting of glue mists to other areas.

It is a further object to provide equipment for such lamination which is efficient for its intended purpose and saves labor and increases production capacity over presently known operations.

BRIEF DESCRIPTION OF THE DRAWINGS

Other objects and advantages will become apparent from the following description which is to be taken in conjunction with the accompanying drawings, in which:

FIG. 2 is a front elevation of the shuttle with the lift frames for the blanks and liners;

FIG. 3 is a cross section of FIG. 2 showing the spring suspension for the vacuum cups in detail;

FIG. 4 is a top plan view of the separate blank (with the stops for positioning such blank on the table) and the liner;

FIG. 5 is a top plan view of the combined blank and liner (with the stops for positioning the liner on the blank);

FIG. 6 is a view similar to that of FIG. 5 with the end of the liner lifted from the blank to show the adhesive pattern;

FIG. 7 is a view similar to that of FIG. 4 showing the stops for the blank and liner, with the blank stops registering the blank on the table; and FIG. 8 is a view similar to that of FIG. 5 showing the stops for the blank and liner, with the liner stops registering the liner on the blank.

DESCRIPTION OF THE PREFERRED EMBODIMENT

Bulk Box Construction

Figure 1:
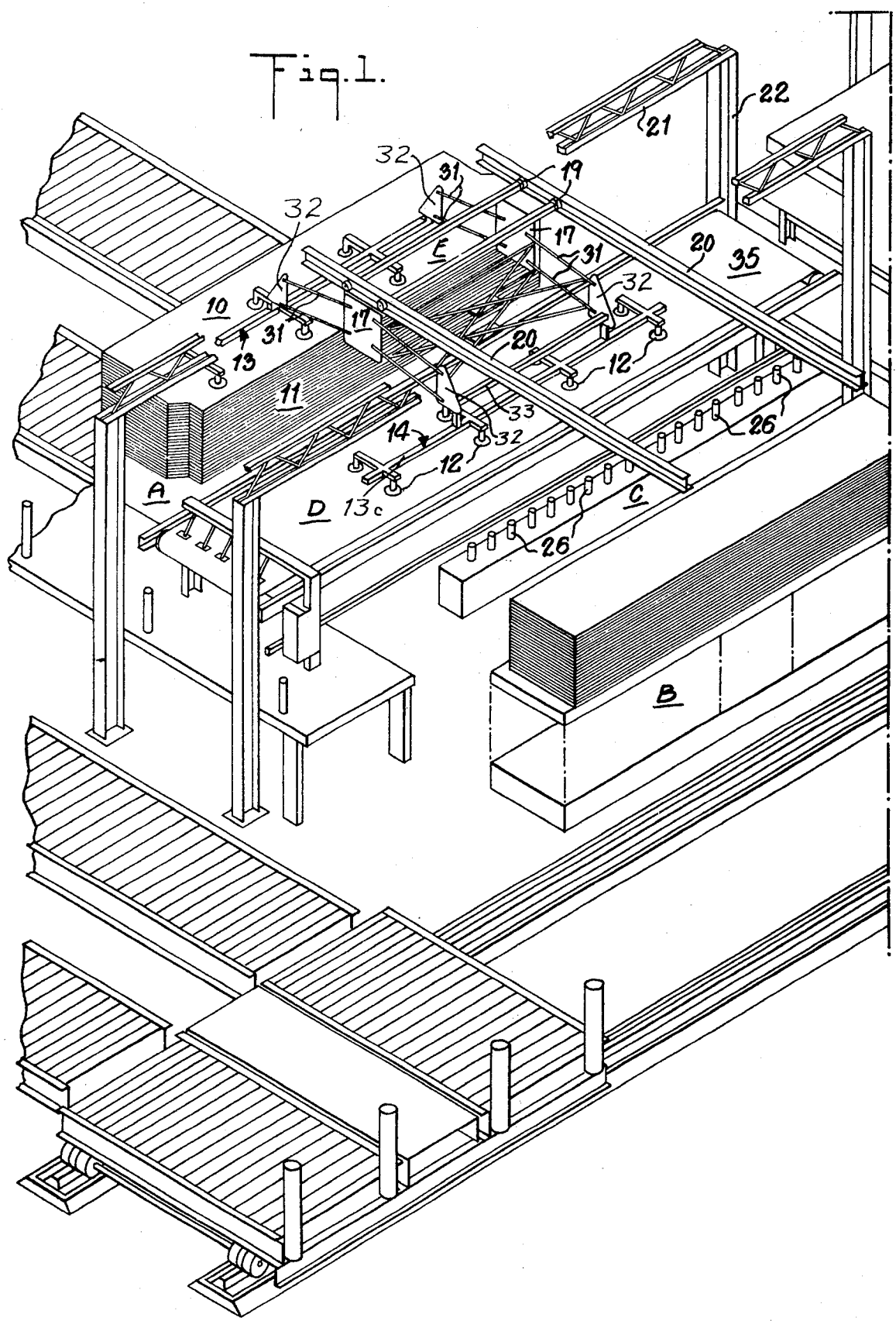
FIG. 1 shows a perspective view of the machine of the present invention.

The current bulk box is made of two pieces of double wall corrugated paperboard that are glued together to form a quadruple wall box. This construction results in a box empty weighting as much as 40 lbs. and which is used for shipping material weighing between 1,000 and 2,000 lbs.

The two pieces are cut and/or scored in a conventional manner before lamination. The larger of the two is called the "blank" and it is the entire outer shell of the finished box. The other is called the "liner" and it provides additional wall thickness and strength to only the four sides of the box.

Glue is applied to one of the contact surfaces, and laminating is done in the flat, with the liner being placed down on the blank. It is important that the liner be properly placed (registered) on the blank so that score lines match between them. A mismatched (out of register) liner will present problems in folding and filling the box.

It will be understood that such apparatus can likewise be used for boxes of any size where similar reinforcement and strength is needed.

It will be further understood that the apparatus can likewise be used for the lamination of flat sheets of different size where the sheets must be registered with each other.

General Description of Apparatus

FIG. 1 shows the general layout of the machine which consists of the following major components designated in FIG. 1 with the capital letters A, B, C, D and E:
  A. Blank lift table
  B. Liner lift table
  C. Glue spray station
  D. Laminating table
  E. Shuttle A. Blank Lift Table.

The blank lift table is a commercially available, hydraulically powered scissors-lift type elevating table. Its purpose is to support and present blanks in the position required by the system. As blanks are removed from the top of the blank stack, the lift table will automatically index upward, thereby maintaining the top of the reduced stack height at a constant distance above the floor. The automatic vertical indexing of the lift table is accomplished through a photocell system which has a beam of light directed across the stack height, at the desired elevation to be maintained. Sections of roller conveyor are mounted on the lift table top to permit easy reloading through the existing plant conveyor system. The conveyor sections on the lift table are movable in the longitudinal or machine direction to permit registration of the blank stack.

B. Liner Lift Table.

The liner lift table is similar in construction and operation to that of the blank lift table.

C. Glue Spray Station.

The glue spray section is a free standing structure located between the liner lift table and the laminating table. It consists of a longitudinal (running in the machine direction), horizontal row of upward aimed spray guns. The guns are air powered and electrically controlled through a photocell system which causes spraying to occur only when liners are being conveyed past the glue station.

D. Laminating Table

The laminating table is a work surface on which blanks and glue sprayed liners are properly registered and laminated. The table is equipped with adjustable mechanical stops against which blanks and liners are placed to insure that they are properly registered in both the machine and the cross-machine directions. These stops are adjustable so that a range of box sizes can be handled. The table top is covered by a flat conveyor belt which is stopped during the laminating operation, and which is automatically started to convey laminated products from the laminating section.

E. Shuttle

The shuttle is an overhead traveling crane type of mechanism which moves in the transverse (cross-machine) direction. Its purpose is to alternately take blanks and liners from the stacks on the lift tables and place them in properly registered positions on the laminating table. Each time a liner is laminated to a blank, the assembly is removed from the laminating section by the table conveyor belt. Blanks and liners are lifted from the tops of their stacks on the lift tables by means of vacuum cups that are attached to the underside of the lift frames on the shuttle. The blank and liner lift frames are independently pivoted and are independently raised and lowered by pneumatic cylinders. The vertical sequencing of both lift frames is also independently controlled through the electrical control system.

Referring more particularly to the drawings, the machine of the present invention and its operation will be described together.

A blank 10 is lifted from the stack 11 of blanks on the blank lift table A by the vacuum cups 12 on the underside of each blank lift frame 13 of the shuttle E (FIGS. 1 and 3). When the blank lift frame is elevated to the top of its travel, the air powered, roller chain driven shuttle E transports the blank toward the laminating table D. Movement is accomplished by means of spaced shuttle plates 17, each secured to a member 18 which is hung from rollers 19 which roll in a cross-machine direction on a tranverse beam 20. Such transverse beams are in turn hung from longitudinal beams 21 supported by a frame 22. As the shuttle approaches the point at which the blank is to be deposited on the table, the blank lift frame 13 is lowered by pneumatic cylinder 18a. The blank, moving in the cross-machine direction, contacts the cross-machine direction blank stops 15 on the laminating table (FIG. 4). Then the blank lift frame 13 is caused to move in the machine direction by a pneumatic cylinder (not shown) until the blank contacts the machine direction blank stop 16 on the laminating table. This bi-directional movement causes the blank to be properly registered in two directions against the stops on the table. Simultaneously, the liner lift frame 14 is lowered to pick up a liner 24.

Signals from electrical limit switches (now shown) on the stops cause the vacuum on the blank lift frame to be turned off so that the blank 10 is free. At the same time the vacuum cups 12 on the liner lift frame are turned on and the liner 24 is held by the vacuum cups ready for transport. Both lift frames are raised and the shuttle will move to transport the liner toward the laminating table D. As the liner passes above the glue spray station C, which is located between the liner lift table and the laminating table, a photocell circuit is activated to cause glue 23 to be sprayed from a row of spray guns 26 upward onto the underside of the traveling liner (FIGS. 1 and 6). As the shuttle approaches the position at which the liner is to be deposited, the liner lift frame is lowered by pneumatic cylinder 18b and the liner is brought into contact with stops 27 and 28 (FIG. 5). Signals from electrical limit switches (not shown) on such stops cause the liner lift frame to be moved in the machine direction by a movement similar to that used on the blank. When bi-directional registration of the liner against the stops 27 and 28 (FIG. 5) has been achieved, as indicated by the actuation of the appropriate electrical limit switches, the liner will be released by removal of the vacuum induced forces. Simultaneously, while the glued liner 24 is being lowered onto the blank 10, the blank lift frame is being lowered to pick up a blank for the next laminating cycle.

As soon as all restraints imposed by the registration stops have been removed from the laminated assembly, the conveyor belt automatically moves the assembly from the laminating section into an adjoining conventional compression section. After a controlled time delay, to allow the laminating section to be cleared of the assembly, a new blank is brought into position to start a new cycle.

The stacks of blanks and liners are delivered to the lift tables by means of a floor mounted roller conveyor system which is conventional and does not form a part of the present invention. The stacks are moved across the rollers on the tables until they are in proper position to be picked up by the lift frames of the shuttle.

The apparatus may be provided with suitable synchronized electrical controls so that each new laminating operation will not continue automatically until the preceding laminated assembly has been cleared by downstream operations. Each new laminating operation will continue to the point where the blank has been placed on the laminating table, the liner has been picked up and is ready to be glued. The automatic operation will not go beyond this point until the "CLEAR" signal is received. When the CLEAR signal is received, the shuttle will transport the raised vacuum held liner toward the laminating table. As the liner passes above the glue spray station it interrupts the glue spray photocell system causing the glue to be sprayed upward onto the underside of the liner.

The liner lift frame is automatically lowered so that the attached liner is placed against two cross-machine direction liner stops that are located on the laminating table. When limit switches are actuated indicating that a liner has been placed in proper registration in the cross-machine direction, the liner lift frame is automatically moved in the machine direction until the liner actuates another limit switch indicating that the liner has been put in proper registration in the machine direction. Simultaneously, the blank lift frame is lowered onto the stack of blanks on the lift table.

The positions of the various stops during the operation are shown in FIGS. 7 and 8. The stops 15 will be at the belt level on the laminating table to limit the motion of the blank as it is moved from the stack to the laminating table in a cross-machine direction. As the blank is moved in a machine direction by a pneumatic cylinder it comes into contact with stop 16. Such stop 16 is rotatable about an axis 16a and disappears under the laminating table out of the way when not in use.

The liner stops 27 and 28 come into play when the liner starts its travel to be placed on top of the panels of the blank. The stops 27 and 28 are mounted on frames 29 and 30 which rotate 90° on axes 27a and 28a to place the stop frame on the blank to limit the travel of the liner as it is moved from the stack to the blank and register the liner on the blank in both directions. The stops also serve to clamp the blank to the table. The face 28b of the stop 28, which is angular, limits the cross-machine direction travel of the liner in conjunction with stop 27, whereas the face 28c of the stop 28 limits the machine direction travel of the liner on the blank.

Liner stops which are mounted on the laminating table serve a dual purpose. Their primary purpose is to provide an adjustable face against which liners are placed for proper registration. Secondly, they provide physical limits to shuttle travel after registered placement and within overtravel limits, as provided by the flexible mounting of the vacuum cups.

Further describing the shuttle, the spaced shuttle plates 17 support a parallelogram linkage frame 31 to which is attached end plates 32. Such plates 32 are further spaced by tube member 33. Slideably and pivotedly mounted on the tube members 33 are the lift frames 13 and 14. Connected between each tube member 33 and its attached lift frame is a pneumatic cylinder (not shown) which serves to move the said lift frame in a machine direction for proper registry. As a result of the parallelogram linkage of the lift frames to the shuttle plates 17, the lift frames on which the vacuum cups are attached always remain horizontal regardless of vertical positions. The lift frame 13 is made up of a bar 13c to which are attached cross members to hold the vacuum cups (FIG. 1). Each cross member is made up of a top member 13a to which is adjustably affixed a bottom member 13b so that the spacing between the vacuum cups on each cross member can be varied (FIG. 2). The bar 13c is suspended from the spaced end plates 32 by a lift frame pivot connection which consists of a bracket 13d with a hole through which passes a bar 34 (FIG. 2) secured to the end plate 32. A pneumatic cylinder (not shown) connecting the end plate 32 and the bar 13c permit the bracket 13d and affixed bar 13c to move along bar 34 in a machine direction for proper registry. Such connection also provides rotatability during the vacuum cup attachment or pickup connection. The lift frame member 14 is the same as the lift frame member 13.

Both blank and liner lift frames and vacuum cup support assemblies have structural flexibility to allow for some degree of misalignment and misregistration of the blanks and liners in their stacks. The vacuum cups are attached to the lift frames by means of helical springs and swivel joints that allow for overtravel of the shuttle after blank or liner placement has been completed. Referring to FIGS. 2 and 3, each lift frame 13 and 14 runs in a machine direction and contains a sufficient number and distribution of vacuum cups 12 to insure that each blank or liner will be properly picked up and transported. Each cup is individually suspended with a spring 36 and the cup is attached to the spring suspension with a swivel joint. The cup is secured to one end of a threaded nipple 37, the other end of the nipple being secured to a swivel ball 38. The ball is retained between a retainer plate 39 and a center piece 40. Such plate 39 and piece 40 are secured together and fastened to a retaining plate 41 by screws 42. Air flows from the cup to a vacuum reservoir (not shown) through the nipple 37, the swivel ball 38 into a chamber 43 formed by the center piece 40 and the plate 41, and exits through the threaded port 44 in piece 40 to the reservoir. The vacuum cup suspension is attached to the lift frame by a flexible metal cable 45 secured at each end to upper and lower spring retaining discs 46 and 47. The disc 47 is affixed to the retaining plate 41 and the disc 46 is affixed to the lift frame. The spring 36 is held at each end by the discs 46 and 47. The flexible cable 45 provides control of the extended length of the spring but permits the spring to compress without restraint.

During the pickup operation, the flexible suspension system serves two purposes: (1) it allows each cup suspended from the lift frame to seek its own height and thereby seat properly against the load; and (2) it permits each cup, within the limits of construction, to assume the attitude of the plane of the board in the load. Without a compliant arrangement the pickup operation would be unreliable.

The flexible suspension serves another purpose during the transporting of a sheet from the supply stack to the laminating table. It permits the leading edge of the sheet to contact a pair of stops which have been placed in its path while allowing the shuttle to continue on to contact its set of stops with a minimum of stress on the vacuum attachment. The shuttle system is designed so that its controlled length of travel is always greater than the travel required to bring the sheet from its supply stack to the stops, thereby insuring an amount of overtravel that will guarantee proper placement and registration. As a result of contacting the stops both sheet and shuttle are positively located in space.

With this approach it is not necessary to know the exact position of the sheet in the supply stack or, for that matter, require that each sheet be place directly on top of the preceding one. Within specified limits we can pick up a sheet that is improperly oriented in the stack and still insure that it will be registered properly against the stop in both the machine direction and cross-machine direction.

This spring suspension system for the vacuum cups permits the proper registration of the pieces of the box and is thus one of the key factors in successfully automating the limitation of such pieces.

When the liner has been properly registered in the machine direction the blank machine direction stop 16 is lowered below the tabletop, and both liner crossmachine direction stops 27 and 28 are rotated upward, raising them off the laminated assembly. These movements provide clearance for the laminated assembly to be conveyed away, and clearance for the succeeding blank which will be placed there. Both blank and liner lift frames are raised and the liner lift frame is returned to its position away from the machine direction registration point.

The conveyor belt 35 on the laminating table starts and conveys the laminated assembly out of the laminating section. Simultaneously, a timer is energized to prevent any further automatic function from beginning until the laminated assembly has had ample time to be conveyed out. When allowed by the operation of the timer, the shuttle moves to place the blank on the laminating table and starts another cycle.

Thus, among others, the several aforenoted objects and advantages are most effectively attained. Although a somewhat preferred embodiment of the invention has been disclosed and described in detail herein, it should be understood that this invention is in no sense limited thereby and its scope is to be determined by that of the appended claims.

Having thus described the invention, what is claimed is:

1. Apparatus for laminating a liner to the panels of a box blank comprising:
   a support for a stack of box blanks;
   a support for a stack of liners;
   a laminating table interposed between the said supports;
   a shuttle movable in a cross-machine direction, said shuttle having spaced means for gripping and lifting blanks and liners and being adapted to take alternately blanks and liners from the stacks on the supports to the laminating table and place a blank in registered position on the laminating table and a liner in registered position on the blank;
   stops projecting upwardly from the laminating table to limit the forward and side motions of the blank and register it in position as it is placed on the laminating table;
   stops movable into position over the blank to limit the forward and side motions of the liner and register it in position on the blank;
   adhesive applying means to apply adhesive to the liner as it moves from the stack to the laminating table; and
   means to convey the laminated liner-blank from the laminating table.

2. Apparatus for laminating a first sheet in registry on a second sheet having at least one dimension larger than the corresponding dimension of the first sheet comprising:
   a support for a stack of first sheets;
   a support for a stack of second sheets;
   a laminating table interposed between the said supports;
   a shuttle movable in a cross-machine direction, said shuttle having means for gripping and lifting first and second sheets and being adapted to alternately take said sheets from the stacks on the supports to the laminating table and place a second sheet in registered position on the laminating table and a first sheet in registered position on the second sheet;
   stops projecting upwardly from the laminating table to limit the forward and side motions of the second sheet and register it in position as it is placed on the laminating table;
   stops movable into position over the second sheet to limit the forward and side motions of the first sheet and register it in position on the second sheet;
   adhesive applying means to apply adhesive to the first sheet as it moves from the stack to the laminating table; and
   means to convey the laminated sheets from the laminating table.

3. A method for laminating a liner to the panels of a box blank comprising:
   providing a stack of box blanks;
   providing a stack of liner blanks;
   interposing a laminating table between the said stacks;
   positioning spaced means for gripping and lifting blanks and liners with the blank gripping and lifting means over the blank stack and the liner gripping and lifting means over the laminating table;
   actuating the blank gripping and lifting means to pick up a blank from the blank stack;
   moving the spaced means in a cross-machine direction and placing the blank against blank stops to register such blank in a forward and sideways direction on the laminating table with the liner gripping and lifting means positioned over the liner stack;
   actuating the blank gripping and lifting means to release the said blank;
   actuating the liner gripping and lifting means to pick up a liner from the liner stack;
   moving liner stops into position over the blank on the laminating table to limit the forward and side motions of the liner to be placed on the blank and register such liner on the blank;
   moving the spaced means in a reverse cross-machine direction, applying adhesive to the liner and placing the liner against the liner stops in a registered position on the blank on the laminating table;
   moving the liner stops out of position from over the blank on the laminating table to permit the laminated liner-blank to be moved from the laminating table; and
   conveying the laminated liner-blank from the laminating table.

4. A method for laminating a first sheet in registry on a second sheet having at least one dimension larger than the corresponding dimension of the first sheet comprising:
   providing a stack of first sheets;
   providing a stack of second sheets;
   interposing a laminating table between the said stacks;
   positioning spaced means for gripping and lifting first and second sheets with the second sheet gripping and lifting means on the second sheet stack and the first sheet gripping and lifting means over the laminating table;
   actuating the second sheet gripping and lifting means to pick up a second sheet from the second sheet stack;
   moving the spaced means in a cross-machine direction and placing the second sheet against second sheet stops to register such second sheet in a forward and sideways direction on the laminating table with the first sheet gripping and lifting means positioned over the first sheet stack;
   actuating the second sheet gripping and lifting means to release the said second sheet;
   actuating the first sheet gripping and lifting means to pick up a first sheet from the first sheet stack;
   moving first sheet stops into position over the second sheet on the laminating table to limit the forward and side motions of the first sheet to be placed on the second sheet and register such first sheet on the second sheet;
   moving the spaced means in a reverse crossmachine direction, applying adhesive to the first sheet and placing the first sheet against the first sheet stops in a registered position on the second sheet on the laminating table;
   moving the first sheet stops out of position from over the second sheet on the laminating table to permit the laminated first and second sheets to be moved from the laminating table; and
   conveying the laminated sheets from the laminating table.

* * * * *